Dec. 1, 1953   J. W. FAY ET AL   2,661,103
STACKING AND CONVEYING APPARATUS
Filed Jan. 22, 1952   7 Sheets-Sheet 7

INVENTORS
Joseph W. Fay
Rudolph J. Fay
BY
Kegan and Kipnis
Attorneys

UNITED STATES PATENT OFFICE 2,661,103

STACKING AND CONVEYING APPARATUS

Joseph W. Fay and Rudolph J. Fay, Villa Park, Ill., assignors to Schulze and Burch Biscuit Company, Chicago, Ill., a corporation of Illinois Application January 22, 1952, Serial No. 267,543

11 Claims. (Cl. 214—6)

The present invention relates to automatically operated mechanism for stacking and conveying structurally delicate or frangible articles such as soda crackers or cookies supplied to it in a continuous quantity and in an aligned formation and to be assembled into predetermined stacks according to number of constituent units in a stack and to be delivered in said predetermined stacks to a wrapping or packaging machine.

The present invention is an improvement upon co-pending application Serial No. 144,809, filed February 17, 1950.

The principal object of the present invention is to provide an automatically operative machine for the handling and collecting of frangible objects such as soda crackers delivered in a continuous line of supply, which will arrange said objects in stacks of predetermined unit quantities, conveying them to a precise station of a wrapping machine.

Another object of the present invention is to provide a conveyor and handling apparatus for delicately constituted comestibles which will achieve positive and secure engagement of said comestibles without subjecting them to contact with forces or materials likely to effect crushing or breakage.

A further object of the present invention is to achieve an assembly line machine for collecting predetermined quantities of soda crackers into packaging stacks from a plurality of supply lines, thereby increasing the input capacity of the apparatus whilst collecting and directing the stacks onto a single conveyor system for delivery to a packaging machine.

Yet another object of the present invention is to provide an automatic article handling machine which will collect predetermined quantities and arrange them into stacks attended by infallibly responsive feeding and aligning accessories which may be delicately adjusted as to variations in alignment and movement directing forces, whereby to suit the responses of said machine with regard to the various phases of its collector and conveying operations to the structural frailties of the subject article under treatment for the purpose of reducing the hazard of loss due to breakage and wastage to a minimum.

The foregoing and other objects of the invention are fully met by a system of conveyor apparatus which in its broad aspects comprises a pair of inclined chutes onto which attendants place a continuous supply of soda crackers or similar articles according to the rate of depletion. Between the chutes, and at a lower level, there are disposed the horizontal uppermost flights of a pair of endless belt chains which together constitute a conveyor, the links of which support suitable space partitioning fingers. Between them predetermined space accommodations are formed for protectively surrounding the predetermined stacks of crackers after they have been counted out and collected. From the inclined chutes the crackers are directed to fall into a vertical space chamber against the surface of a rotary collector wheel which engages each one, thrusting it forwardly to a second chamber, where it is allowed to fall downwardly aided by a projected air stream, assuring safe yet speedy descent.

One of said collector wheels is located beneath each vertical space chamber, and the periphery of each wheel is studded with a predetermined succession of equally spaced radial shoulders having an amplitude predeterminedly designed to accord with the thickness of the soda crackers or other subject to be collected. Both of the collector wheels are mounted on a common shaft by which they are alternatively driven through a respective cycle of operation, resulting in the accumulation and stacking of a predetermined quantity of crackers according to the peripheral studding accommodation of the wheels.

The action of the collector wheels is to engage a rearmost edge of said soda cracker with each of its radial projections and to thrust the cracker between a pair of soft, cushiony, guide rollers, one of which is driven and the other idle. The delivery action accomplished by these rollers is to thrust each soda cracker forwardly and downwardly into a space chamber foremost thereof until the proper quantity has been accumulated into a stack. Thereafter pneumatically actuated plungers thrust the collected stacks in alternative sequence onto the already described conveyor belts. The plungers are disposed on opposite sides of the conveyor and act in alternate timed succession, projecting the stacks first from one side and then from the other as the conveyor operates in intermittent progression.

The conveyor movements advance the stacks of crackers step-by-step forward upon their uppermost horizontal flight until a foremost stack reaches an intermittently acting elevator plunger which engages the foremost stack, raising it to a predetermined level and into the center of an awaiting wrapper sheet which is thereat folded around the cracker stack downwardly and underlappingly, whereafter the collected stacks of crackers are made into unitary packages with sheet wrappers subsequently to being accumulated within more durable enclosing media.

In order that the invention may be more fully disclosed, reference is now had to the accompanying drawings in which is illustrated a preferred embodiment of apparatus and certain modified details setting forth the principles of construction and operation, together with the advantages and capabilities as will be pointed out during the course of the following detailed explanation, or as are inherent in the present invention. For purposes of clarity in understanding, the following description is explicit, and the accompanying drawings are detailed, but it is to be understood that this exposition is illustrative only, and that the invention is not to be restricted to the particular details of recitation in the specification, nor to the arbitrary illustration in the drawings.

In its broad aspects, the present invention may be considered as an accessory device, because it is designed to collect the product subject matter, in the illustrated example soda cracker biscuits, for presentation to a subsequent machine which accomplishes wrapping and sealing. Accordingly, it has been constructed so as to function in timed relation to the principal machine, and for this purpose is driven by a power take-off arrangement which will be discussed later. The principal machine is designated in Figs. 1 and 2 in fragmentary and dotted outline as having the side frames 21 and 22 with appropriate package wrapping apparatus adapted to perform the wrapping operation at an elevated horizontal work level labeled for reference purpose 23.

The function of the improvement device is to collect crackers into predetermined stacks, in the instant embodiment eleven to a stack, and to present these stacks conveniently to the wrapping machine. Accordingly, the auxiliary machine is supported upon a principal pair of end frames 24 and 25, see particularly Fig. 4, with which are integrally associated the horizontal side frame members 26 and 27 respectively.

The side frame members 26 and 27 are made of inwardly open channels, the front ends of which are secured as by bolting or welding to the framework 21—22 of the wrapping machine. Rotary power is obtained from a principal operating shaft 28, Figs. 1 and 2, located in the wrapping machine, which carries at one end a cam flywheel 29 and at its opposite end a crank disc 31. At an intermediate position of shaft 28, there is secured a driving sprocket wheel 32 which meshes with a drive chain 33 for imparting rotation to a driven sprocket wheel 34 on a transverse intermediate shaft 35 which extends through the side frames 26 and 27.

Figure 1:
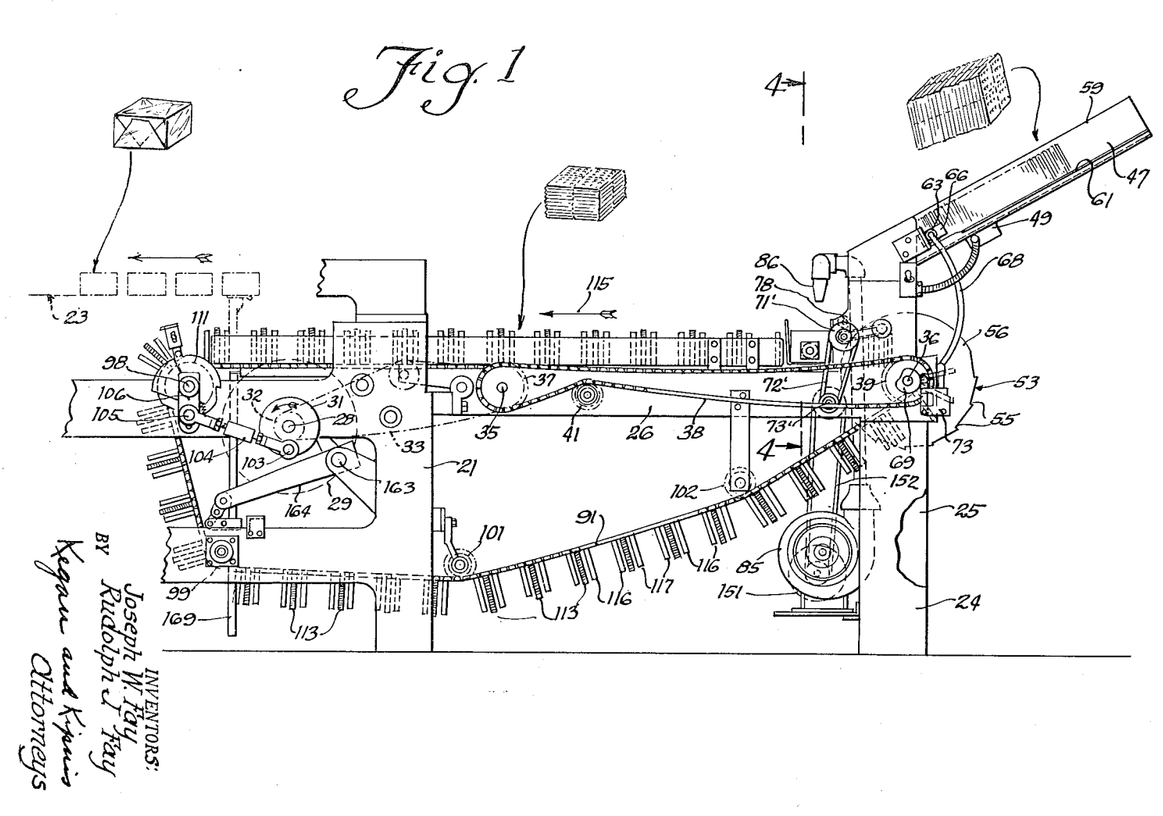
Fig. 1 is a side elevational view with detailed perspective view reference supplements of a stacking and conveying apparatus in accordance with the principles of the present invention.
Figures 8, 9, 13:
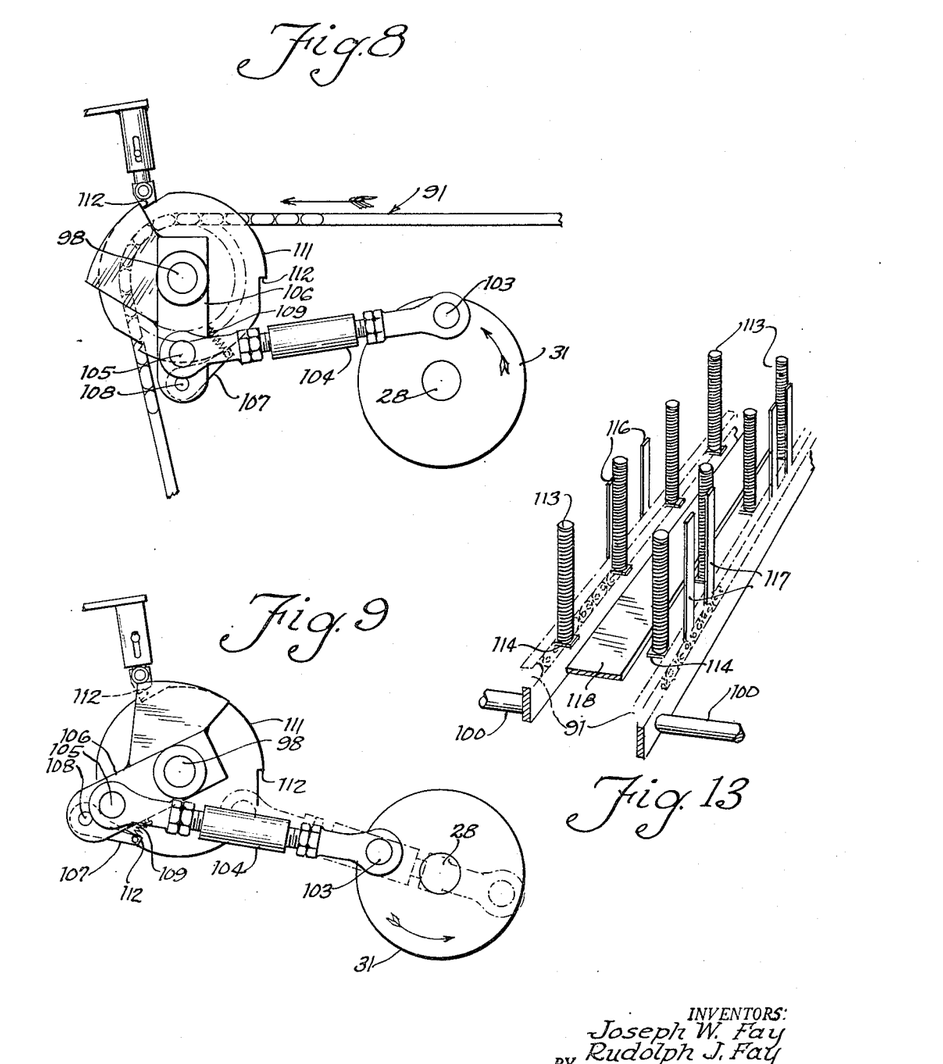
Fig. 8 is an enlarged side elevational detail view of the intermittent motion clutch mechanism and its power take-off arrangement.
Fig. 9 is a view of the same apparatus illustrated in Fig. 8 in an alternative condition of operation.
Fig. 13 is an enlarged detail perspective view of a fragmentary portion of the conveyor.

Power take-off shaft 28 rotates in a counter-clockwise direction as viewed in Figs. 1, 8, and 9, so that accordingly similar rotation is transmitted to the intermediate shaft 35 and by it in turn to the main cam shaft 36, through a further sprocket chain drive which comprises the driving sprocket wheel 37 on shaft 35, the sprocket fitting link chain 38, and the driven sprocket wheel 39, Fig. 1.

For purposes of taking up slack and wear adjustment, the chain 38 is provided with an idler slack take-up sprocket 41 and through the aforedescribed train of driving and driven elements continuous rotary motion is made available to the principal cam shaft 36 so long as the wrapping machine power mechanism is rotated subject only to the selective control of a pneumatically supervised clutch generally designated 42.

Figure 2:
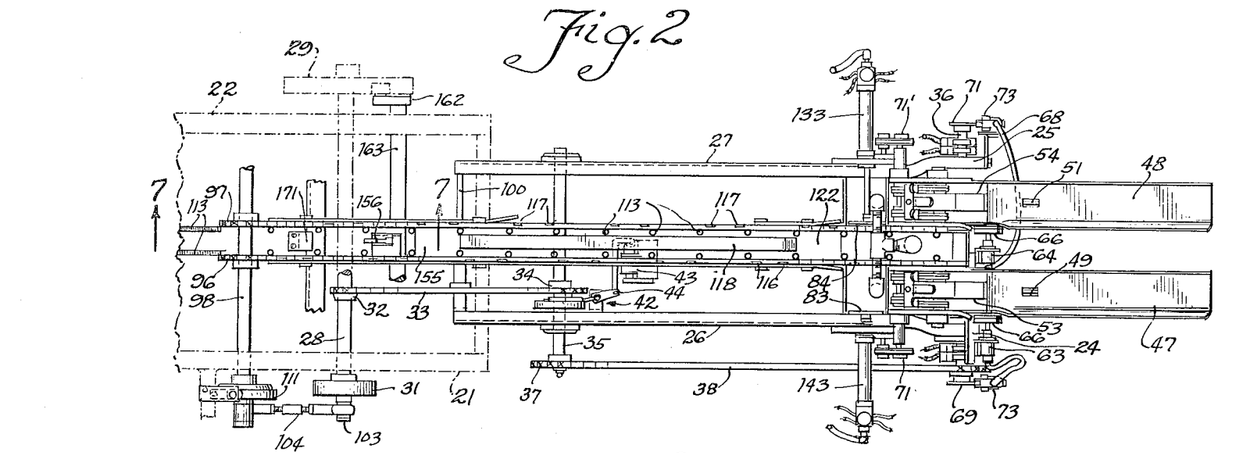
Fig. 2 is a plan view of the same apparatus.
Figure 3:
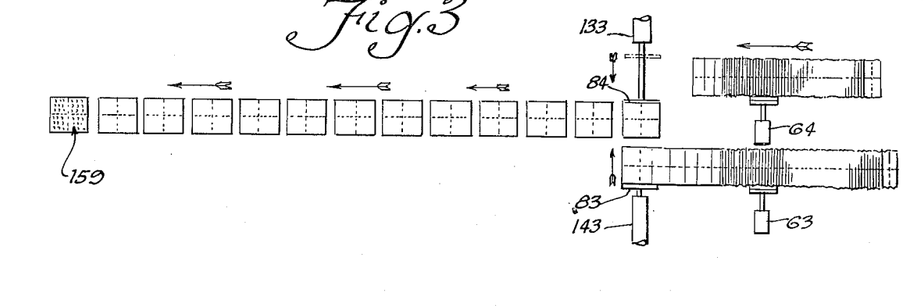
Fig. 3 is a diagrammatic companion plan view, illustrating the path taken by the crackers in comparison with the apparatus showing of Fig. 2.
Figure 12:
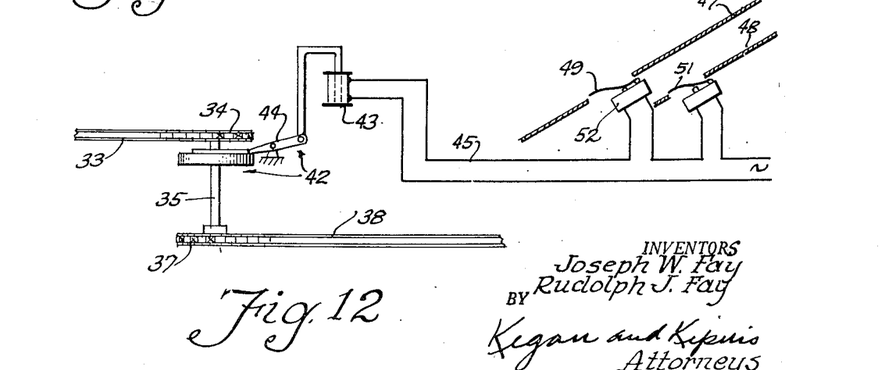
Fig. 12 is a fragmentary circuit diagram of the pneumatic clutch throw-out control mechanism which is conditioned upon an adequate supply of incoming crackers on each of the supply line chutes.

The operating pneumatic cylinder device 43, Fig. 2, which regulates the position of the clutch lever, see also Fig. 12, is actuated by an electromagnetic relay (omitted in Fig. 12) under the supervision of a low voltage supervisory circuit 45. This circuit is maintained closed during the presence of a full supply of crackers in each of the chutes 47 and 48, that is, so long as a switch 52 in each chute is kept closed by a feeler lever 49, 51 associated therewith. Conversely, therefore, the depletion of crackers in either of the chutes is a condition which interrupts the continuous operation of the rotary drive system below the clutch 42.

For the purpose of supervisory timing and regulation, driven shaft 36 of the auxiliary apparatus is provided with a series of timing and operating cams as will be described later, and may therefore be considered to be the principal timing device of the stacking and conveying auxiliary unit. This same shaft carries the two distributor discs 53 and 54, see also Fig. 5, whose peripheries are studded as at 55 in a predetermined manner with a predetermined number of angular toothed projections throughout a major portion of the circumference of their disc and with a dwell portion 56 throughout a minor angular position of the circumference thereof.

Figure 4:
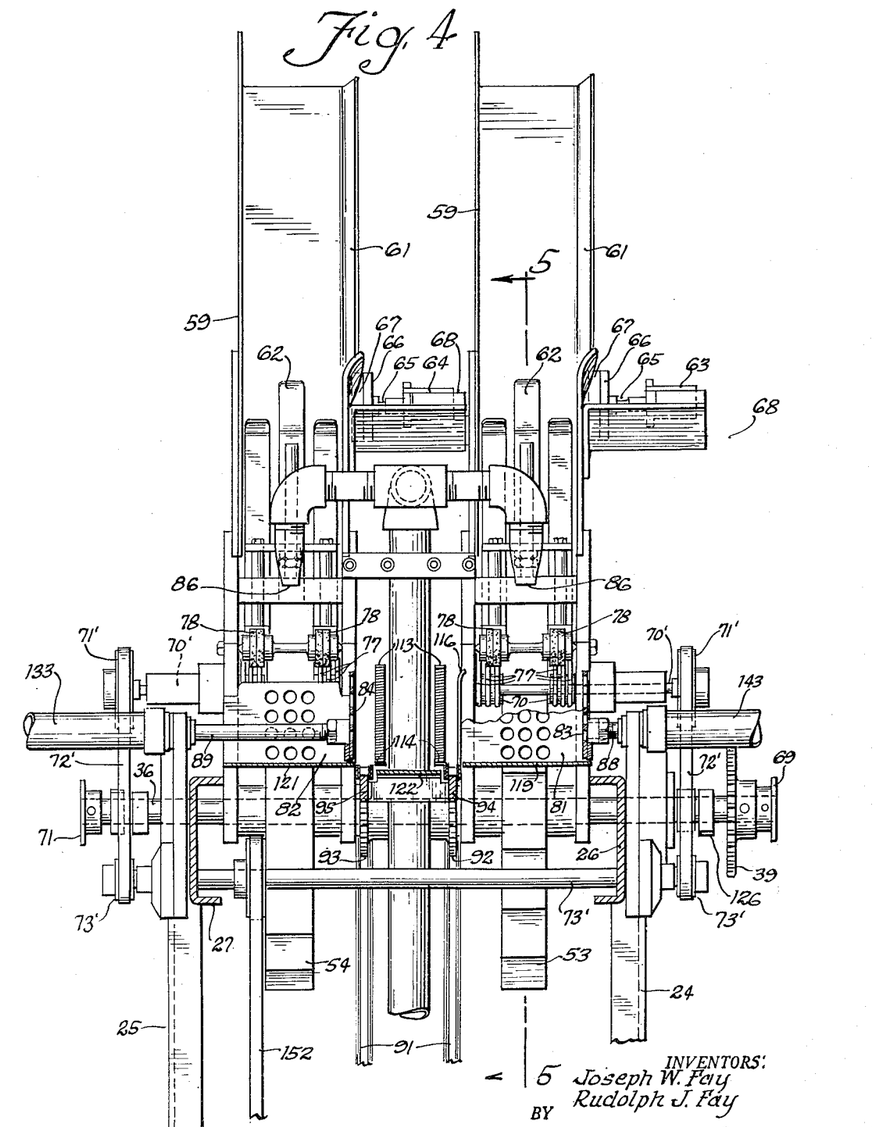
Fig. 4 is an enlarged, transverse sectional view taken approximately on line 4—4 of Fig. 1.
Figures 5, 6:
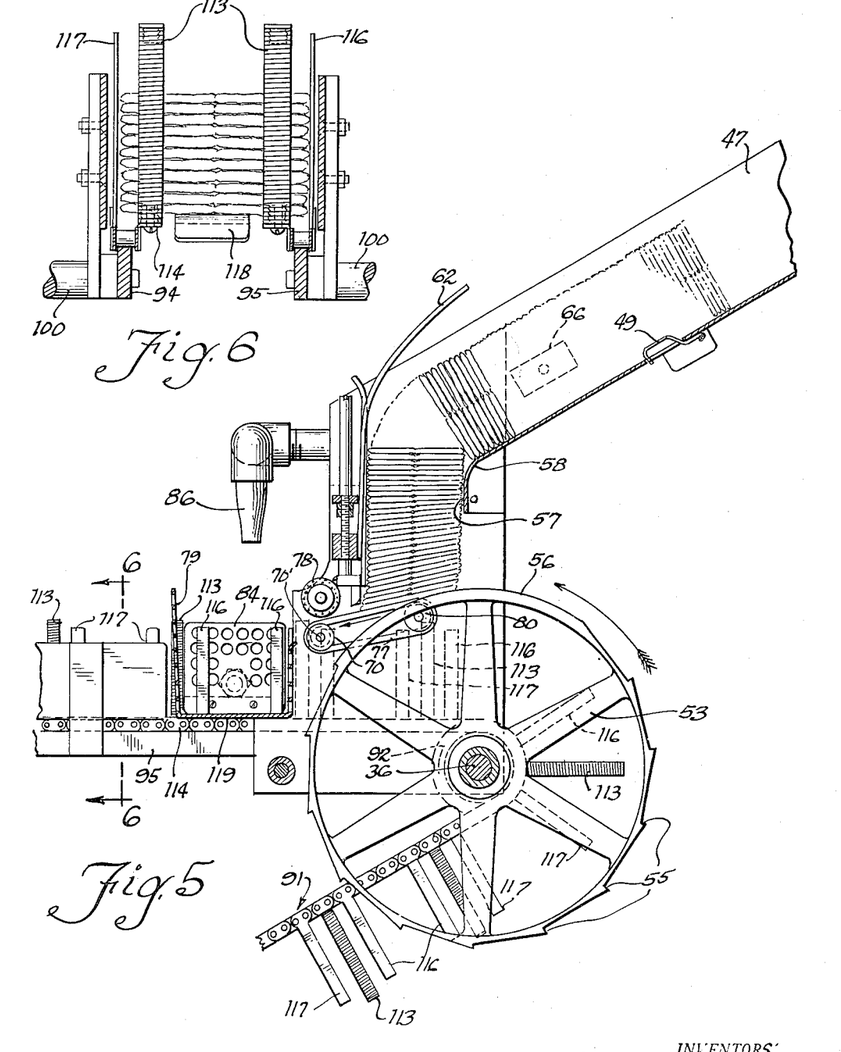
Fig. 5 is an enlarged transverse sectional detail view taken approximately on line 5—5 of Fig. 4.
Fig. 6 is an enlarged fragmentary detail view, taken approximately on line 6—6 of Fig. 5.

The soda crackers or other articles which are to be accumulated into stacks are obtained from a nearby supply source such as a continuous conveyor system, and are placed by an attendant operator into the chutes 47 and 48, see Figs. 1, 2, and 5. In the original loading of each of the chutes, the soda crackers are first placed into the throat portion 57, Fig. 5, in a substantially horizontal position with the lowermost cracker assuming a slightly downwardly angled disposition as best shown in Fig. 5, and with the immediately preceding crackers flaring radially about the curvature portion 58, in which position the crackers are guided and confined by the combined influences of the principal guide plate 59, see also Fig. 4, the shallower companion guide plate 61, and finally by the flaring curved guide fingers 62.

In the upper, inclined parts of the chutes 47 and 48, the crackers assume inclined, parallel positions after the manner in which they have been illustrated in Figs. 1 and 5, riding over the soft action contact levers 49 and 51 as they are periodically advanced, and descending gravitationally to assume the positions successively which had been occupied by their predecessor crackers as the progress of stacking distribution proceeds.

The width of the chutes 47 and 48 is adequately generous to permit the crackers to be placed from the supply source into the general position, Figs. 1 and 5, with but a general degree of parallelism and alignment because means are provided for infallibly achieving proper alignment automatically during their course of progress as will now be described.

At the side of each chute 47 and 48 there is supported a pneumatic piston housing 63 or 64, each containing a thrust piston with a foremost projecting rod 65 on the extremity of which is mounted a pusher head 66 whose face is lined with a layer of soft compressible sponge rubber 67.

Figures 10, 11:
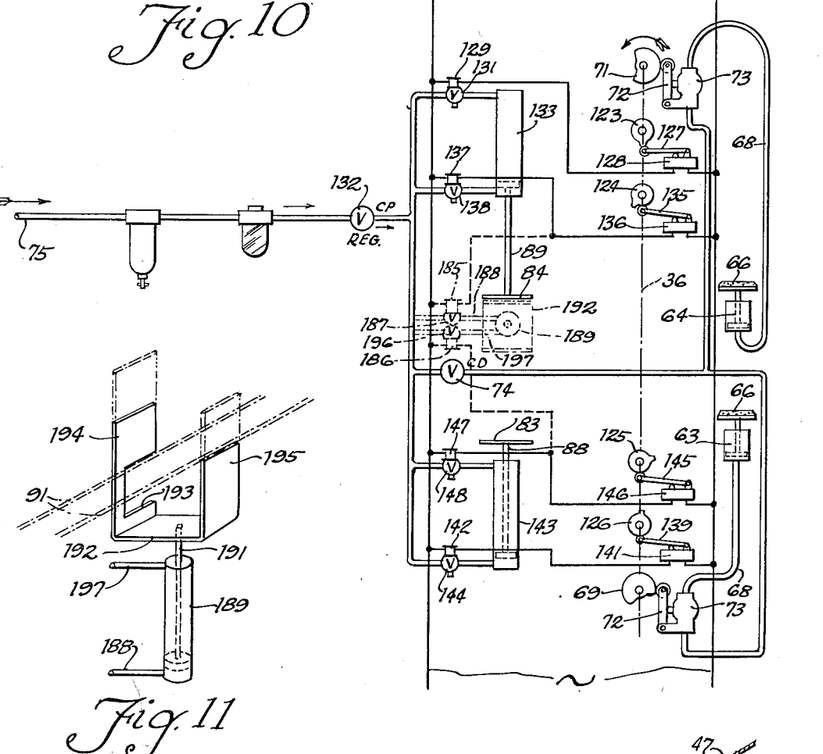
Fig. 10 is a diagrammatic circuit illustration of the pneumatic and electrical supervisory system.
Fig. 11 is a fragmentary detail perspective view of a modified form of conveyor chain access-regulating apparatus.

Each of the within contained pistons, together with its rod 65 and head 66 is adapted to be projected forwardly during a cyclic interval when a quantity of air under compression is permitted to enter into the chamber of its respective housing through a conduit 68, see also Fig. 10. This actuation is effectively accomplished by the introduction into conduits 68 of a slight, short pulsation or air current.

As best indicated in Fig. 10, these pulsations or air currents are advantageously supervised by means of the cams 69 and 71, whose high lobes (not shown) are mutually offset in timed relationship one with one another so that as they act upon their follower levers 72 to stimulate the respective control valves 73, pulsations of air pressure regulated through some type of conventional relief as at 74 and originating at the source 75, cause the pistons 66 to be operated alternately.

A preferred plan of operation is to permit piston-extended position for the major portion or duration of an operating cycle, and to retract them for a relatively brief interval of time. This permits the inclined stack of crackers to be held back or retarded in their descent regardless of their quantity and prevents congestion such as would result from friction in the region 57 because of a variable factor of gravitational pressure.

It is to be understood that the cushion faced heads 66 act in the dual capacity of bringing the crackers into more precise alignment as well as retarding their gravitational descent to relieve the variable weight factor of the magazine load from the feeding operation. The soft, yielding, sponge rubber faces conform readily to any cracker edge irregularities and to any chance variations in their width dimensions. In this manner there is eliminated the otherwise present hazard of crushing and breakage which is due primarily to the highly brittle or frangible character of the subject matter worked upon.

During the aforedescribed brief interval when the cylinders 63 and 64 are permitted to retract their respective piston and pressure pads 66, the alignment of crackers is released to descend a distance which corresponds with the thickness of eleven crackers that have meanwhile been spent in assembling the previously arranged stack. Upon the resumption of the pressure condition in each columnar chute assembly, its respective toothed wheel 53 enters upon a cycle of active distribution, engaging eleven crackers successively with its teeth 55 and thrusting them forwardly from the position shown by the lowermost cracker in solid lines of Fig. 5, to one forward thereof, whereupon the cracker will be engaged between the pliant rubber belt elements 77 and the uppermost sponge rubber rollers 78.

The endless feed belts 77 extend over drive pulley members 70, see also Fig. 4, and idler pulleys 80. Pulleys 70 are carried upon shaft 70' and at their outermost extremities mount the driven pulley wheels 71', which in turn are driven by the endless belts 72', each of which is looped around a respective driving pulley mounted on the common drive shaft 73'. In order to provide a high velocity delivery of the crackers between the yieldable rubber belts 70 and their pressure wheels 78, rotary power for driving the aforedescribed train of apparatus is preferably supplied by a local source, such as the electric motor 151, Fig. 1.

The driving pulley carried on the end of motor 151 is connected through an endless drive belt 152 with the common drive shaft 73', and as viewed in Fig. 1, the direction of motion transmitted from this motor through the distribution system aforedescribed is in all cases counterclockwise, with the idler sponge rubber faced pressure rollers 78 rotating clockwise. Upon leaving the influence of the belt 77 and rollers 78, each cracker is thrust forward with a sufficient velocity to bound gently against the forward wall 79, Fig. 5, of a stockade or enclosure which includes in addition to the forward wall 79 already mentioned, one of the rear walls 81 or 82.

Each of the stockades or enclosures is further bounded by a movable side wall element 83 or 84 which is also a plunger head, and all of the wall members which thereby enclose three sides of the so-called stockade are characterized by being provided with a profuse distribution of apertures provided for the purpose of permitting the free flow and dissipation of contained air currents. Such porosity provisions have been found by experiment to be of utmost importance in achieving the speedy precipitation or settling of the column of crackers to form the desired stack. It has been found that the air stream is further of advantage when directed slightly off-center from the vertical of each stockade as best designated in Figs. 1, 4, and 5. The air stream thus directed is compressed at a suitable source 85' through the nozzles 86 which may be carried over a common supply conduit 87 and be permitted to flow continuously.

Each stockade is filled with the requisite predetermined quantity of soda crackers alternately, whereafter the projection of further soda crackers is momentarily arrested. During this rest interval, the related wall element 83 or 84, which is in reality the face of a plunger rod 88 or 89, is caused to be moved forward into the position shown by element 84 in Fig. 4, having started from a relative position shown by the wall element 83 at the right of the same figure. As a consequence of such sideward shifting, the stack of crackers is transferred onto an awaiting chargeable space of the conveyor belt 91 between the two parallel endless chain belt components. Conveyor 91 is advanced in intermittent motion intervals by the companion sprocket wheels 96 carried on a shaft 98, Fig. 7. On the opposite end of the auxiliary machine these belt chains roll over idler sprockets 92 and 93, free rolling on timing shaft 36, Fig. 4.

The direction of travel of this belt and consequently of its idler and driving sprockets is counterclockwise as viewed in Fig. 1. Throughout the uppermost leg of each flight the links which comprise each belt chain are supported on edgewise positioned leveling bars 94 and 95, which extend horizontally and parallelly beneath the full length of each uppermost flight leg of each chain and which are appropriately supported from the channel frame members 26 and 27 by means of sidewardly jutting studs 100 to afford ample rigidity.

At their forward terminals these flights end where each chain encircles its respective driving sprocket 96 and 97 integrally associated with an intermittent motion shaft 98. Thereafter, the respective flights continue downwardly, angling in a return direction slightly and guided over the idler sprocket 99, one for each chain, Fig. 7, followed by subsequent idler sprockets 101 and 102, Fig. 1. The intermittent motion which is characteristic of shaft 98 is derived from a crank action power take-off also originating at the primary power take-off shaft 28 of the principal or wrapping machine discussed above. This shaft is provided at one of its ends with the already described crank wheel 34, a flush disc member carrying on its outer face a crank pin 103 which articulates one end of a turnbuckle link 104 whose other end is correspondingly connected as at 105 with a reciprocable crank arm 106.

Shaft 28 rotates in a counterclockwise direction as observed in Figs. 8 and 9, carrying the pin 103 with it and while so doing operates the turnbuckle link 104 in a reciprocal to-and-fro manner, causing the arm 106 to be rocked throughout a predetermined angular distance also in a to-and-fro manner. At its outermost extremity, arm 106 carries a pivotal pawl member 107 which is itself biased in a counterclockwise direction about its pivot 108 by a spring 109. The toothed extremity of pawl 107 is adapted to ride the periphery of a clutch disc 111 having precisely divided ratchet teeth, so that as a consequence, each reciprocal motion transmitted through the link 104 manifests itself in a rotation of shaft 98 in a counterclockwise direction for an angular distance which corresponds to the angular distance between the successive teeth 112 in the disc periphery. This distance when translated into the motion of conveyor belt 91 is by design made to correspond precisely with the length of successive loading spaces between the boundary springs 113, aligning pairs of which are mounted on angle brackets 114 formed as extensions of certain ones only of the chain belt inner links.

The spring fingers 113, best indicated in Figs. 6 and 13, constitute yieldable end barriers or partitions which define the charging spaces on the conveyor belt 91 and within which a stack of soda crackers is adapted to be confined as the belt progresses in the direction of the arrow 115, Fig. 1.

Figure 7:
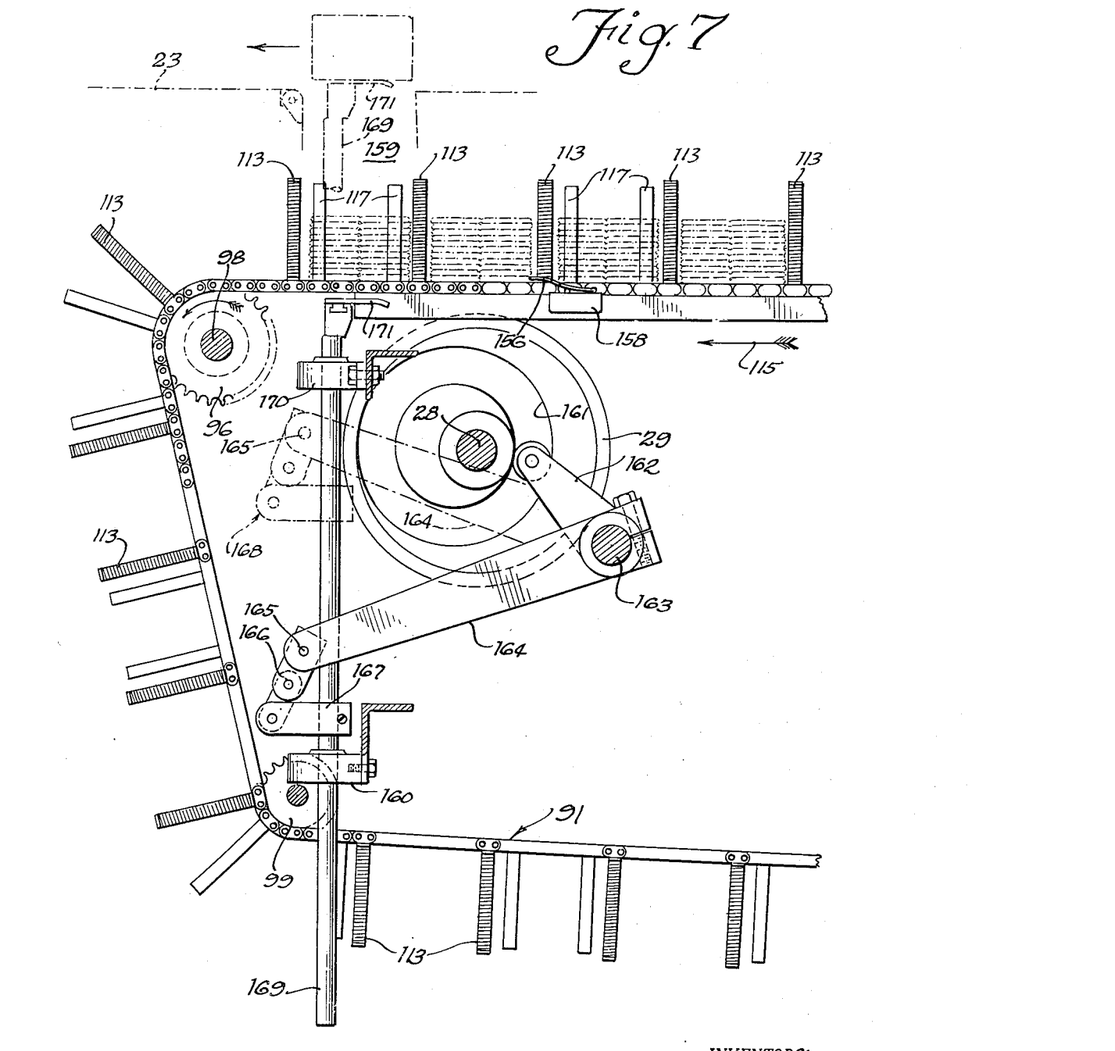
Fig. 7 is an enlarged longitudinal sectional view through the foremost end of the conveyor belt featuring the package lift or elevator mechanism and its actuating apparatus.

As the belt is fed around sprocket wheels 96, 99, 101, and 102, these fingers swing radially about each rotary axis after the manner best indicated in Fig. 7, and for this reason require adequate clearance for a distance corresponding to their height during the entire course described by the belt flight.

As the conveyor belt is adapted to be charged first from one side and then from the other in accordance with the aforedescribed operation of the charging plungers 83 and 84, so too the endless conveyor belt 91 is provided with upstanding side barrier elements 116 and 117 of which a pair are arranged on one side of one enclosure or charging space and immediately following on the succeeding charging space a corresponding pair are arranged on the opposite side. This arrangement is most clearly to be observed from the disclosure in Fig. 13 and in Fig. 7 where because of the presence of the stacks of soda crackers in the upper flight leg of the conveyor chain, the end barriers 116 and 117 are more contrastably illustrated.

It is evident from the disclosure of Figs. 2 and 6, that intermediate the major distance of the horizontal flight of chain belts which together comprise conveyor 91, there is provided a stationary support platform 118 having a downwardly sloping fore portion or skid (not shown) at one end nearest the charging station. This member provides bottom support to the stacks of crackers for the principal portion of their course of travel after they have been placed upon the central conveyor system 91. The charging action of each plunger 83 and 84 is of course to push its related column of soda crackers from the accumulation floor 119 or 121 with which it is associated onto an intermediate floor section 122, Fig. 4, and thereafter during the intermittent movement of the conveyor belt 91 the crackers are advanced from the floor element 122 to the longitudinal floor support 118 already described.

From Fig. 10 it will be observed that the timing and operation of loading plungers 83 and 84 is controlled from the principal timing shaft 36 by means of two pairs of timing cams designated 123 and 124 for operating the plunger 84, and 125 and 126 for operating plunger 83. From the position shown in Fig. 10, it will be observed that timing cam 123 has just encountered its associated follower lever 127, with the result of effecting closure of contact pair 128 contained within a switch housing, causing to be closed a circuit for operating electromagnetic relay 129. As a consequence, air pressure valve 131 has been opened, permitting a current of air from source 75, regulated for pressure by the valve 132, to project the operating piston within its housing 133, whereupon plunger 84 is observed in its foremost condition, which corresponds with that during which its related column of crackers is discharged onto the conveyor 91.

Briefly following this operation, the apex of timing cam 124 will encounter its follower lever 135, causing to be closed a contact pair 136 for completing an energizing circuit for electromagnetic relay 137. Meanwhile, the apex of cam 123 will have ridden off its follower lever 127, permitting relay 129 to become deenergized and its related pneumatic control valve 131 to be closed.

As a consequence of the energization of relay 137, air valve 138 will open, and a surge of regulated air under pressure will enter the fore portion of piston chamber 133, retracting its contained piston together with rod 89 and plunger head 84. All of the foregoing operations which pertain to the projection and return of piston 84 are consummated by the timing cams 123 and 124 during the brief interval of dwell which intervenes successive movements of conveyor belt 91. It is also to be noted that during the operation of plunger 84, conveyor belt 91 is so disposed as to present a charging area of its chain in which the back-stop fingers 116 are in alignment with said plunger 84 rather than in the alternate condition where the backstop fingers 117 are in charging alignment.

Shortly following the retraction of plunger 84, cam 71 becomes effective to release its follower lever 72 and permit the descent of the column of crackers disposed on the inclined chute 48.

About 180° later in the rotary cycle of shaft 36, cam 126 encounters its follower lever 139, causing to be closed the contact pair 141 and completing an energizing circuit to electromagnetic relay 142. As a consequence, valve 144 is opened and a gust of operating air from source 75 is permitted to enter the piston housing 143 from the rear, projecting its contained piston outwardly and thrusting the rod 88 together with plunger 83 into the forward position, whence it will discharge an accumulated stack of crackers from the floor level 119 onto the conveyor space then waiting and in readiness to receive this load. Under such circumstances, it will be understood that back-stop fingers 117 will be in alignment with plunger 83 rather than fingers 116 due to a single step advance of the conveyor 91 and the alternate arrangement of the conveyor chain fingers 116 and 117.

Briefly following this operation, the apex of cam 126 rides off its follower 139, relay 142 becomes deenergized, permitting valve 144 to close, and in rapid succession cam 125 presents its apex against follower 145, causing to be closed the contact pair 146, with the result that relay 147 is energized. As a consequence, valve 148 is briefly opened, permitting a gust of air to enter the fore portion of piston housing 143, with the result that its contained piston is retracted together with plunger 83.

Summarizing briefly the operation discussed in the foregoing description, it will be noted that in accordance with the system disclosed, two supply sources of crackers or other material which is to be stacked are directed through the storage chutes 47 and 48 to channels which collect stacks, in the instant embodiment comprising eleven units or crackers to each stack. The particular number may be varied in accordance with the design of distributor wheels 53, and when the subject matter has the characteristics of soda crackers it is advantageously aided in its stacking by the use of an air stream directed over the stacking column which accomplishes the dual purpose of accelerating the descent as well as of somewhat cushioning the fall of each soda cracker as it arrives at its level in the stacking alignment.

The stacks are moved alternately one from the left side collector and then one from the right side collector, entering alternately staggered storage spacing of a conveyor belt 91. These spacings are by design arranged to stop so as to align squarely at the respective shift plunger 83 or 84. Its opening is presented at the right time to the proper one of the alternately operating plungers. Thereafter, the accumulated stacks of crackers advance in a step-by-step manner as the conveyor belt 91 moves in the direction designated by the arrows 115 in Figs. 1 and 7, until a foremost stack of crackers reaches the position which the foremost stack is shown to occupy in Fig. 7.

In arriving at this station, the stacks ride off the longitudinal platform 118 and are for a brief interval supported by the chain belts themselves, Fig. 2. A vacancy is thus afforded so that any crumb accumulations may fall into a nethermost catch container or other provision. In this space or vacancy a soft pressure contact lever 156 protrudes for the purpose of sensing continuity in the supply of stacked alignments of crackers.

The contact lever 156 acts upon a micro-switch unit 158 located in a supervisory circuit which affects the continued supply of wrapping paper for the purpose of saving waste of wrapper in the event that the continuous supply of stacks should not be forthcoming due to any reason of failure.

When an ultimate stack of crackers reaches the position designated 159 in Fig. 7, which may be aptly termed the elevator or lift position, supply wheel 29, whose side face is channeled with a box cam groove 161, undergoes the principal portion of its cyclic rotation, rocking the bell crank arm 162 clockwise about its pivotal shaft 163, as a result of which the other arm 164 of the bell crank, which is articulated at 165 through a linkage 166 with the lift clamp 167, raises all of the aforedescribed connecting elements to the dotted outline position generally designated 168, Fig. 7.

As a result, the elevator lift rod 169 is raised to its uppermost level, sliding within its guide journals 160 and 170 and carrying the stack supporting platform 171 from its solid outline position, Fig. 7, to its dotted outline position, which corresponds with the delivery level 23, Fig. 1, at which the wrapping machine is adapted to receive charges for thereafter consummating its wrapping operation.

*Modifications*

In lieu of the alternate spacing arrangement which is required of the conveyor belt 91 whereby the barrier fingers 116 and 117 are alternately placed on opposite sides and which necessarily requires the belt to contain an even number of charging spaces, a modified arrangement of structure is featured in Fig. 11 with a superimposed control circuit modification dotted into the illustration of Fig. 6. In accordance with this arrangement, the conveyor chain which comprises the system generally designated 91 need not be provided with limit side fingers 116 or 117, but instead solely with the yieldable coiled spring end fingers 113. When under such circumstances charging space is presented into the position whereat it is to receive a stack of crackers, either from the platform 119 or from the platform 121, an electrical supervisory circuit under the control of contact pair 136 or 146 is closed under the energization of its related cam 124 or 125, and as a consequence there is energized a relay 185 or 186 respectively.

If relay 185 is energized, there results the opening of an associated air valve 187, which causes operating air under pressure to be introduced through the lowermost channel 188, see also Fig. 11, into the piston chamber 189 which contains an operating piston and rod 191 that acts upon the U-shaped baffle member 192, raising or ejecting the piston together with said member 192 so that the aperture 193 of its longer wall element 194 is brought into alignment with the oncoming charge or stack of crackers projected by the plunger 84, in which case the opposite wall element 195 functions as a limit barrier to prevent the stack from being shifted too far.

Under the alternative condition of operation when switch 146 is closed, it causes a supervisory circuit to open a valve 186, permitting air under pressure to enter through channel 197, see also Fig. 11, whereupon the piston is depressed together with its rod 191 and said member 192, permitting a charge or stack of crackers to enter from the right by clearing the lower wall 195, which is now depressed below the conveyor level, and with the opposite solid portion of the longer wall 194 serving as a limit barrier to prevent the stack from being shifted too far on the conveyor belt.

Having thus fully disclosed our novel stacking and conveying apparatus and demonstrated its utility by reference to a specific embodiment and modification thereof, we claim as our invention:

1. In a machine for collecting and delivering soda crackers or similar articles in stacks to a principal wrapping machine, a pair of inclined chutes onto which crackers are loaded in contiguous alignments for gravitational descent, an endless belt conveyor disposed between said chutes, a rotary wheel beneath each of said chutes onto which said crackers gravitate for counting out a predetermined quantity thereof during each cycle of rotation, a stockade within which said counted-out crackers are collected, a plunger associated with each of said stockades for shifting a collected stack of crackers from said stockade onto said belt conveyor, a pneumatic piston and housing for selectively projecting and retracting each of said plungers, a timing shaft carrying cams for supervising the selective projection and retraction of said pneumatic pistons and thereby of said plungers, a rotary power take-off driven by a continuously rotating shaft of the principal wrapping machine for operating said timing shaft in timed relation with the operation of said principal wrapping machine, and a reciprocating power take-off also driven by said principal wrapping machine shaft for advancing said belt conveyor in intermittent movements between successive operations of said stockade plungers.

2. The combination set forth in claim 1 in which said belt conveyor includes attached partitioning fingers dividing said conveyor into charging areas, and additional attached fingers for limiting the shift placement of said stacks onto said conveyor, said additional fingers being alternately disposed with respect to said charging areas of said conveyor belt to accord with the alternate operation of said pneumatic piston actuated plungers.

3. The combination set forth in claim 1 in which said timing shaft includes two pairs of timing cams, one pair for each of said pneumatic pistons, a pneumatic control valve for each of said cams, an electromagnetic relay for actuating each of said valves under stimulus of its related one of said cams, one valve of each pair of valves being effective to control the projection of its related piston and the other valve of each pair its retraction, said cams having apexes disposed to operate related said relays and valves in a manner to first project its piston during rest intervals intervening the intermittent advancement of said belt conveyor and then to retract said piston before a succeeding movement of said conveyor.

4. An auxiliary machine for counting out and delivering stacks of soda crackers to a principal wrapping machine comprising, a pair of inclined chutes on which crackers are loaded in contiguous alignments, an endless belt conveyor disposed between said chutes for advancing stacks of said crackers to said principal machine, a rotary counting wheel beneath each of said chutes on which said crackers gravitate from said chutes, a stockade associated with each wheel into which said counted crackers are collected, a plunger associated with each of said stockades for transferring a collected stack of crackers to said belt conveyor, pneumatic means for projecting and retracting each of said plungers, a timing shaft for supervising said pneumatic means, a rotary power take-off driven by a continuously rotating shaft of the principal wrapping machine for operating said timing shaft in timed relation with said principal wrapping machine, and a reciprocating power take-off also driven by said principal wrapping machine shaft for advancing said belt conveyor in intermittent movements between successive operations of said stockade plungers.

5. The combination set forth in claim 4 in which said belt conveyor includes partitioning fingers which divide said conveyor into predetermined charging spaces alternately facing to address said stockades successively, said timing means being phased to operate the related one of said pneumatic means when addressed by a charging space open in its direction.

6. The combination set forth in claim 4 in which said timing shaft includes two pairs of timing cams, one pair for each of said pneumatic means, a pneumatic control valve for each of said cams, an electromagnetic relay for actuating each of said valves under stimulus of its related one of said cams, one valve of each pair of valves being effective to control the projection of its related pneumatic means and the other valves of each pair its retraction.

7. The combination set forth in claim 4 in which each of said inclined chutes includes a transversely acting pressure member, a compressible face lining for each said members, and an operating pneumatic pressure responsive device for advancing each of said members and its face lining into pressure engagement with crackers or similar articles aligned in its said chute and to withdraw said member cyclically from said pressure engagement whereby to achieve the dual function of maintaining alignment of said crackers and regulating the gravitational progress of said crackers on said chute.

8. The combination set forth in claim 4 in which each of said inclined chutes includes a pneumatic pressure member having a compressible face lining for advancing into pressure engagement with crackers or similar articles aligned in its said chute and to withdraw therefrom cyclically whereby to regulate the gravitational progress of said crackers on said chute.

9. In a duplex magazine conveyor system, a pair of inclined chutes each comprising a magazine for supporting a supply of soda crackers for gravitational descent, a vertical throat portion at the lower extremity of each of said chutes arcuately blending therewith into which its crackers are radially directed to gravitate, a wheel associated with each throat portion having a peripheral area which is studded with shoulder presenting teeth for engaging and projecting a predetermined number of crackers and a peripheral area which is smooth, adjacent stockades one for each of said counting wheels within which said projected crackers are assembled in a column, a single chain belt conveyor traversing horizontally between said stockades and having upstanding partitioning fingers arranged to define chargeable areas open at alternately opposite sides to address said stockades alternately, a plunger for shiftably displacing a column of crackers for each of said stockades into its related conveyor chargeable area, and a timing device for actuating each plunger to displace its stockade contained column only when addressed by a chargeable area of said conveyor open at its respective side.

10. In an automatic cracker assembling system, a pair of inclined chutes each for supporting a supply of soda crackers for gravitational descent, a vertical throat portion at the lower extremity of each of said chutes radially blending therewith, a counting wheel associated with each throat portion studded throughout a portion only of its periphery with shoulder presenting teeth for engaging and advancing a soda cracker with each tooth, adjacent stockades one for each of said counting wheels within which said advanced crackers are assembled in a column, a conveyor traversing between said stockades having chargeable areas open at alternately opposite sides to address said stockades successively, a plunger for shiftably displacing assembled crackers from each of said stockades into its related conveyor chargeable area, and a timed control apparatus for actuating each plunger to displace its stockade contained column only when addressed by a chargeable area.

11. The combination set forth in claim 10, comprising a power drive train for the conveyor, including an intermediate disconnect clutch for intermittently advancing said conveyor between said stockades and a discharge destination station, and means comprising an electric control circuit, circuit closing contacts, and a contact operating lever in each of said stockades for disconnecting said clutch and thereby arresting progress of said conveyor when the supply of soda crackers in any of said magazines becomes depleted.

JOSEPH W. FAY.
RUDOLPH J. FAY.

References Cited in the file of this patent

UNITED STATES PATENTS

| Number | Name | Date |
|--------|------|------|
| 2,323,350 | Paynter | July 6, 1943 |
| 2,576,366 | Smith | Nov. 27, 1951 |